United States Patent [19]

Chapman

[11] Patent Number: 4,694,544
[45] Date of Patent: Sep. 22, 1987

[54] RELEASABLE CONNECTOR

[76] Inventor: Jon Chapman, 5968 Via Lemora, Goleta, Calif. 93117

[21] Appl. No.: 899,150

[22] Filed: Aug. 22, 1986

[51] Int. Cl.4 .......................... A41F 1/00; A43C 11/00
[52] U.S. Cl. ........................................ 24/625; 24/653; 403/290; 403/316
[58] Field of Search .............. 403/290, 316, 317, 341; 24/615, 653, 654, 625

[56] References Cited

U.S. PATENT DOCUMENTS

| 490,831 | 1/1893 | Lohers | 403/290 X |
| 2,199,076 | 4/1940 | LaSota | 403/290 |
| 3,014,744 | 12/1961 | Craik | 24/653 X |
| 3,600,917 | 8/1971 | Krock | 24/615 X |

Primary Examiner—Andrew V. Kundrat
Attorney, Agent, or Firm—Beehler, Pavitt, Siegemund, Jagger, Martella & Dawes

[57] ABSTRACT

A releasable connector having a male member with spaced prong ends and a tubular female member having an open end for receiving said prong ends and divided at said open end into legs by axially extending slots and a unitary locking means removably interposable between the prong ends and an annular portion for bridging the joint interface between the interlocked male and female members.

9 Claims, 5 Drawing Figures

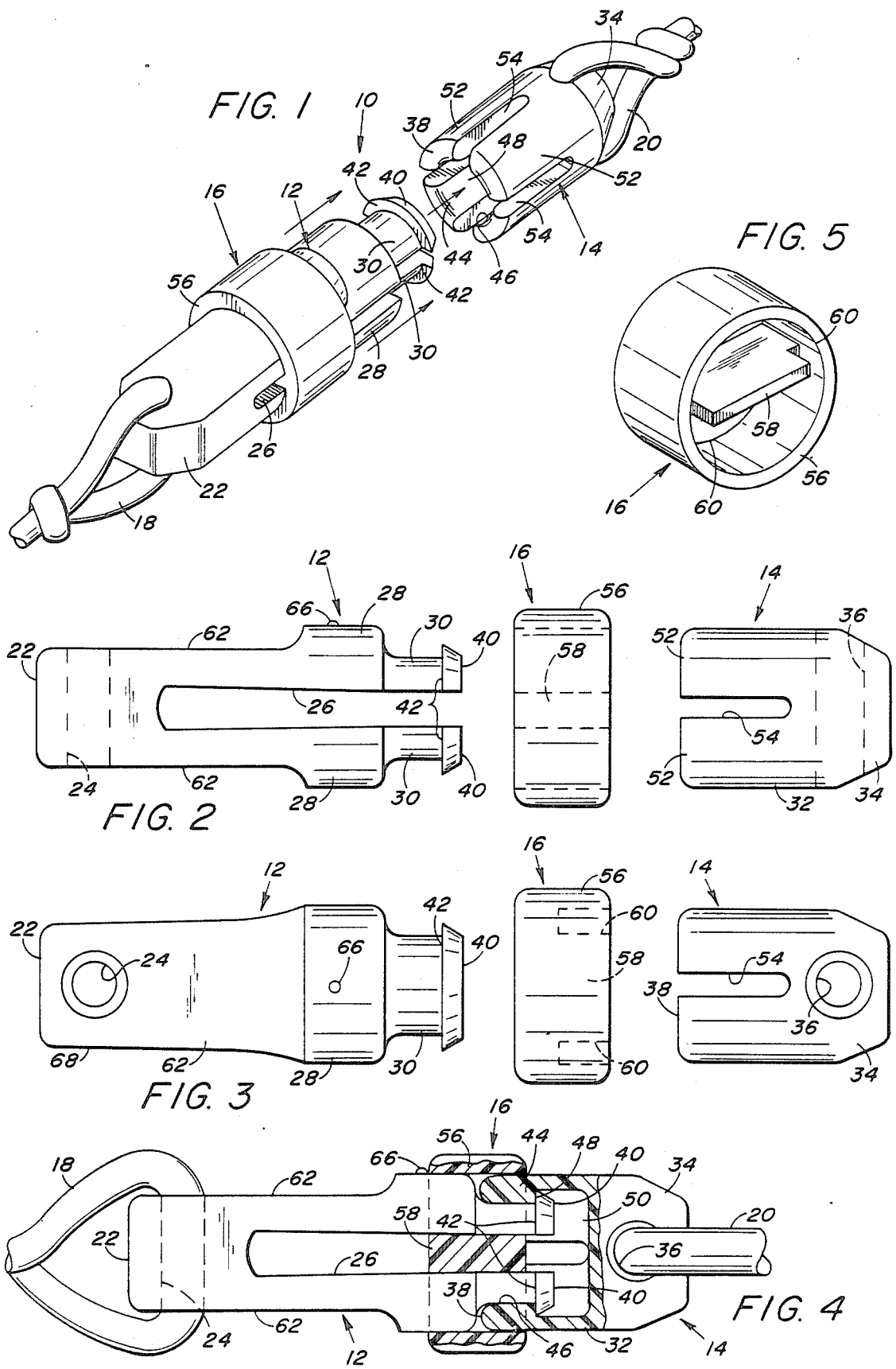

RELEASABLE CONNECTOR

BACKGROUND OF THE INVENTION

1. Field of the Invention

The present invention is directed generally to connectors useful for linking together the ends of two lines, ropes, or the like in a readily releasable manner, and is more particularly directed to such a connector particularly suited for marine applications.

2. State of the Prior Art

Many seashore and marine activities, including various water sports require or benefit from use of various lines, tie ropes, rigging lines, etc. for interconnecting persons or articles for purposes of convenience, safety or utility. For example, ocean surfers ususally wear a line looped around one ankle and tied at its other end to the surfboard. In the event that the surfer falls off the board, he or she is spared having to look for and swim after the surfboard which is thus always tied to the person and easily retrieved. To detach himself from the surfboard, the surfer must loosen the loop which is provided with a slip knot, and then must slip the loop off his foot. While this arrangement works well, it would be far more convenient to have a connector releasably coupling the ankle loop to a tie line segment secured to the surfboard so as to quickly and easily allow the surfboard to be detached from the surfer's foot when temporaily leaving the water or when for any other reason it is desirable to momentarily separate from the surfboard.

Such a connector should be immune to salt water exposure, operate reliably, simply and quickly, without being affected by penetration of sand or salt deposits into the device. Still further, the connector should be sufficiently lightweight such that its presence is not substantially felt by the surfer, yet must be strong enough to reliably and consistently withstand the considerable forces exerted on the tie line when a surfboard is tumbling and pulling away from a surfer in a breaking wave.

This applicant is unaware of any existing, available coupler which fully meets the above requirement.

SUMMARY OF THE INVENTION

The present invention addresses the aformentioned needs by providing a releasable connector comprising a male member attachable to the end of one line segment, a female member attachable to an end of a second line segment and a locking member. The male member is momentarily compressible in cross-section for releasably axially coupling with the female member for interconnecting the two line segments. The locking member is movable between a release position permitting the aformentioed compression of the male member, and a locking position preventing such compression thereby to secure the male and female members in mating engagement.

More specifically, the male member has at least two prongs terminating in normally spaced apart prong ends which are resiliently compressible towards each other for insertion into the female member. Upon such insertion, the prong ends return to their normal spaced apart position thereby interlocking interiorly with the female member to prevent separation of the male and female members, until the prongs are again deliberately squeezed together. The locking member in its locking position is interposed between the prong ends preventing such squeezing together and consequently secures the male and female members in mating engagement.

The male member may have an elongated, generally cylindrical body partially divided along its axis by a longitudinally extending diametric slot into two parallel, generally semi-cylindrical prongs separated by the slot but having prong ends which are resiliently squeezable together to thereby reduce the diameter of the male member in a direction transverse to the slot at the prong ends. The female member is tubular and has a cylindrical tubular wall open at one end for axially receiving the prong ends in their squeezed together condition. Detent elements are provided on the prong ends and the tubular wall of the female member such that upon resilient separation of the prong ends within the female member, the detent means interlock to retain the male and female members in mating relationship.

In a presently preferred embodiment of the invention the detent elements include radially enlarged flanges on the prong ends defining a male detent shoulder extending fully circumferentially about the cylindrical surface of each prong, and a radially inwardly projecting lip defining an internal female detent shoulder about the entire circumference of the open end of the female member. The two prongs can be squeezed together thereby to compress the diametric dimension of the male member in a direction transverse to the longitudinal slot. However, the squeezed together prong ends do not vary in diameter in a direction aligned with the slot plane and thus the male detent shoulders remain in partial diametric interference with the female detent shoulder in the plane of the slot, notwithstanding squeezing of the prong ends. The tubular wall of the female member is resiliently diametrically expandable to yield to such limited interference and accept the squeezed together prong ends. The male detent flanges and preferably also the female detent lip may be chamfered or rounded so as to facilitate mating insertion of the prongs without deliberate squeezing of the prongs, but have opposing substantially square detent shoulders which prevent axial disengagement of the mated elements until the prongs are actually squeezed together to partially disengage the interlocking detent elements on each member, the female tubular wall then yielding in response to axial pulling force to allow complete disengagement of the two members.

The locking ring in the presently preferred embodiment is axially slideable along the male member and includes a diametric web extending through the longitudinal slot in the male member, such that in the locking position the diametric web is interposed between and positively maintains the prong ends in normal spaced relationship thereby ensuring against separation of the connector members.

These and other features of the present invention will be better understood from the following detailed description of the preferred embodiment taken with reference to the accompanying drawings.

BRIEF DESCRIPTION OF THE DRAWINGS

FIG. 1 is a perspective view of a releasable connector according to this invention illustrating the male and female members disengaged from each other.

FIG. 2 shows the three component elements of the connector of FIG. 1 in axially exploded side view taken edgewise to the slot in the male member and the web in the locking ring.

FIG. 3 is an axially exploded view as in FIG. 2 but with all three elements rotated 90 degrees about their longitudinal axis from their position in FIG. 2.

FIG. 4 is a longitudinal side view partly in section showing the connector in its operatively connected and locked condition.

FIG. 5 is a perspective view of the locking ring.

DETAILED DESCRIPTION OF THE PREFERRED EMBODIMENT

With reference to the drawings, FIG. 1 shows the connector 10 as comprising a male member 12 attached to the end 18 of a first line segment, a female member 14 attached to the end of a second line segment 20 and a locking ring 16 axially slideable along the male member. The male member 12 is mateable to the female member 14 so as to interconnect the line segment ends 18 and 20 by means of the connector 10 and the two members 12, 14 are locked in such mating engagement by the locking ring 16 as will be explained.

Turning now to FIG. 2, the male member 12 is a generally cylindrical, elongated solid body having an outer end 22 perforated by a diametric bore 24 through which is shown threaded the line segment end 18 as best seen in FIG. 4. The male member body is partially divided by a slot 26 extending fully diametrically through the body but only partially in a longitudinal direction so as to divide the male body 12 into two parallel prongs 28 joined by an undivided rear portion of the male body 12 and having prong ends 20 of substantially semi-cylindrical cross section and having semi-cylindrical outer surfaces.

The female element 14 is tubular and includes a cylindrical wall 32 terminating in a closed outer end 34 diametrically perforated by a bore 36 through which is shown threaded the second line end 20 in FIG. 4. The inner end 38 of the female tubular wall 32 is open as best seen in FIGS. 1 and 4 for receiving the prong ends 30 of the male member 12. Each prong end 30 terminates in a radially enlarged semi-circular male detent flange 40 which defines a substantially square detent shoulder 42 with the semi-cylindrical surface of the corresponding prong end 30. The tubular wall 32 of the female member 14 is thickened at the open end 38 to define a radially inwardly projecting lip 44 which defines a female opening 46 of reduced aperture and a substantially square female shoulder 48 forming a transition step into a female cavity 50 of enlarged diameter.

The tubular wall 32 of the female member 14 is divided into four equal legs 52 by four parallel circumferentially equidistant slots 54 extending partially into the female member from the open end 38 in an axial direction. The four legs 52 are thus joined by the solid outer end 34 of the female member. The female detent lip 44 extends circumferentially about the female opening 38, and is segmented into four aucuate lip sections corresponding to the four legs 52, i.e. each leg 52 thus having a female detent segment.

The male and female bodies 12, 14 respectively are made of a material such as polyethylene which is relatively hard but also resiliently deformable to an extent sufficient to permit the prongs 28 to be manually squeezed so as to bring the prong ends 30 together and close the slot 26 between the male detent elements 40. In the normal condition of the male body 12, the prong ends 30 are spaced apart as shown in FIG. 2 and the normal outer diameter of the male detent shoulder 42 is circumferentially uniform and substantially greater than the diameter of the female opening 46, i.e. than the minimum diameter of the female detent shoulder 48. The detent flanges 40 on the male element are thus in diametric interference with the inturned lip 44 on the female member along the entire circumference of both male detent elements 40.

The male element 12 is matingly engageable to the female element 14 by insertion of the prong ends 30 into the female opening 46. This is achieved by squeezing together the prong ends 30 towards each other so as to the close the slot 26 thereby reducing the diametric dimension of the male member in a direction perpendicular to the slot 26. The male detent elements 40 are then able to pass through the restricted female opening 46 and into the enlarged female cavity 50 where the prongs 30 resiliently separate to their normal parallel spaced apart condition as shown in FIG. 4. In this mated condition, the male detent shoulders 42 interlock with the female detent shoulder 48 to prevent axial separation of the male and female members, thus interconnecting the line segment ends 18 and 20.

The squeezing together of the prongs 30 only reduces the male member cross section in one direction, i.e. transverse to the plane of the slot 26 but not in a direction lying within the plane of the slot 26. Thus, the diameter of the male detents 40 will be diminished in the plane of FIG. 2 by squeezing the two prongs, but the diameter of the detents 40 in the plane of FIG. 3 will not be affected. Therefore, it will be appreciated that the squeezing together of the prong ends 30 only partially moves the male detent portions 40 out of diametric interference with the female detent lip 44. In a normal, uncompressed condition of the male member 12, the male detent elements 40 if seen in end view form a divided circular disc and if urged against the female opening 38 will make contact with the lip 44 on all four female legs 52. When squeezed together, the joined male detent elements 40 as seen in end view take on an elliptical shape having a major diametric axis and a minor diametric axis. The major diametric axis is the normal undiminshed diameter of the male detent elements, while the minor cross sectional axis is a temporarily reduced cross sectional dimension of the male member which is lesser than the diameter of the female opening 46. Therefore, squeezing together of the two prongs 28 moves the male detent elements 40 from full circumferential diametric inteference with the female detent lip 44 to a state of only partially circumferential diametric interference with the same. The female member 14 is likewise made of a somewhat resilient material such as polyethylene so that the legs 52 are able to spread diametrically at the open end 34 of the female member in response to inward urging of the male detent elements 40 to thereby admit the diametrically undiminished portions of the male detent elements and allow the prongs 30 to pass through the female aperture 46. The diametric yielding of the segmented female tubular wall 32 is such as to yield to the insertion of the squeezed together prong ends 30 under moderate axial compression notwithstanding the partial diametric interference.

Once coupled as shown in FIG. 4, the prong ends 30 resiliently return to their spaced apart normal condition in which the female detent shoulder segments 48 on all four legs 52 interlock with the male detent shoulders 48 on both prong ends 30. Both male and female detent shoulders are substantially square so as to resist axial forces tending to separate the male and female connector members.

A cylindrical locking ring 16, best seen in FIG. 5, has a cylindrical ring wall 56 and a diametric web 58. The internal diameter of the cylindrical ring wall 56 is slightly oversized with respect to the outer diameter of the male member 12 and also with respect to the outer diameter of the female tubular wall 32. The thickness of the web 58 is substantially equal to the width of the slot 26. The locking ring 16 is thus axially slideable along the male body with the web 58 extending through the slot 26, between an unlocked position shown in FIG. 1 wherein the ring 16 is near the closed end of the slot 26 and away from the prong ends 30, and a locking position illustrated in FIG. 4 wherein the web 58 is interposed between the prong ends 30. When the male and female members are mated and the ring 16 is moved to its locking position the open end of the female tubular wall 32 is partially received within the locking ring and into inlets 60 cut out from the forward edge of the web 58 for this purpose. In the locking position of FIG. 4, the web 58 prevents squeezing together of the prongs 28 and maintains the prong ends 30 in mutually spaced relationship, thereby also keeping the male detent shoulders 42 in full circumferential engagement with the female detent shoulder 48. At the same time, the cylindrical wall 56 encompasses and prevents any spreading of the four legs 52 of the female member so as to keep all the female detent portions 44 in positive interlocking engagement with the male detent flanges 40, thus positively securing the male and female members 12, 14 in mating engagement against forces tending to separate the same. At least one small ring detent nub 66 or equivalent structure may be provided on the prong portions 28 of the male member for further securing the ring 16 in its locking position as best understood by reference to FIG. 4.

The cylindrical shape of the male element 12 is modified by diametrically opposed relief areas 62 which extend from the outer end 22 of the male member and terminate at the unrelieved prong portions 28. The purpose of the relief areas 62 is to provide clearance spaces between the internal surfaces of the ring wall 56 and the male body 12 through which sand and salt deposits may readily shake loose from the ring and thus not intefere with axial sliding movement of the ring along the male body. When the male and female members are separated, the locking ring 16 may also be easily slid off the prong end of the male body 12 so that all parts of the connector 10 can be easily rinsed and cleaned if desired. The width of the slot 26 may increase (its sides diverge) towards the closed end 22 so as to provide internal clearance between the ring web 58 and the internal slot surfaces so that sand etc. accumulating therein may be rinsed out. Still further the male body 12 may be tapered as shown at 68 in FIG. 3 to provide further clearance between the ring 16 and the male member for cleaning and rinsing access.

The connector 10 is disengaged by sliding the locking ring 16 from its locking position of FIG. 4 backward towards the closed end of the slot 26, and then squeezing together on the prong portions 28 to bring together the male detent elements 40, thereby partially disengaging the male detent shoulders 42 from the female detent shoulder segments 48 in the female cavity 50. The male and female elements are grasped one in each hand and the two members are firmly pulled apart while wiggling them relative to each other so as to assist in spreading of the legs 52 on the female member to achieve full disengagement of the opposing detent shoulders.

All three component elements 12, 14 and 16 of the novel connector 10 are readily manufactured at low cost by injection molding of plastic material, preferably of polyethylene which is widely used in marine equipment and is resistant to both salt water and sunlight while also being lightweight and buoyant in water.

From the foregoing, it will be apparent that a simple, easy and fast to operate, reliable, low cost and durable connector has been dislosed which is particularly suited for marine applications. While the need for such a connector has been discussed above particularly in connection with ocean surfing, many other applications and uses for the novel connector will be found not only in marine and sea shore activities but any other applications requiring a versatile, low cost, dependable connector.

It must further be understood that while a particular embodiment of the present invention has been described and illustrated for purposes of clarity and example, many changes, modifications and substitutions can be made to the illustrated embodiment without thereby departing from the spirit and scope of the present invention.

For example, it is possible to modify the illustrated embodiment by limiting the circumferential extent of the male detent flanges 40 such that they extend diametrically only in a direction transverse to the slot 26, and do not extend to the edges of the slot 26. When so limited, full disengagement of the male detent flanges is achieved when the prong ends 30 are squeezed together in which case there is no need to segment the female tubular wall by means of slots 54 and the tubular wall 32 need not be diametrically expandable to achieve separation of the male and female members. However, the security of the connector coupling in such an alternate embodiment would be diminished as compared to the illustrated embodiment. Also, the male and female detent elements may assume a variety of forms, shapes and configurations other than the particular arrangement described and illustrated, and still other changes are possible to other portions of the male and female as well as to the locking member 16 as will be readily apparent to persons possessed of ordinary skill in the art. The scope of the present invention is therefore defined only by the following claims.

What is claimed is:
1. A releasable connector comprising:
   a male member having two prongs terminating in normally spaced apart prong ends;
   a tubular female member having an open end dimensioned for axially receiving said prong ends, said tubular member being divided at said open end into at least three legs by axially extending slots;
   said prong ends being resiliently compressible towards each other for insertion into said female member, said prong ends returning to said normal position within and interlocking with said female member to prevent separation of said male and female members, said prong ends being disengagable from said female member upon squeezing together of said prongs; and
   unitary locking means removably interposable between said interlocked prong ends for securing said male and female members in mating engagement, and with an annular coextensive portion thereof for bridging the joint interface between the interlocked male and female members.

2. A releasable connector as set forth in claim 1 including detent means on said prong ends engagable with said female member upon resilient separation of the prong ends therein for retaining said male and female members in mating engagement.

3. A releasable connector as set forth in claim 2 in which said locking means comprises a locking member received on and slideable along said male member between a release position away from said prong ends allowing the prong ends to be squeezed together for at least partially disengaging said detent means and permitting separation of said male and female members, and a locking position wherein the locking member is interposed between and maintains said prong ends in a spaced apart relationship to secure said detent against disengagement and prevent separation of said two members.

4. A releasable connector comprising:
a male member having an elongated cylindrical body, a longitudinally extending open ended slot diametrically dividing a portion of said body into two substantially semi-cylindrical prongs connected by an undivided portion of said body and having prong ends normally separated by said slot but resiliently squeezeable together in a direction perpendicular to the plane of said slot;
female member including a cylindrical tubular wall open at one end for axially receiving said prong ends in said squeezed together condition and being closed at an opposite end, said tubular wall being divided at said open end into four legs by four axially extending slots, and female detent means radially inwardly projecting from each other of said four legs at said open end;
male detent means projecting radially outwardly on both prong ends and engageable with said female detent means on all four ends upon resilient separation of the prong ends following insertion axially into said tubular wall for retaining said male member against separation from said female member; and
a locking ring including a diametric web extending through said slot, said ring being slideable between a release position away from said prong ends allowing the prong ends to be squeezed together thereby partially disengaging said male and female detent means, said legs being resiliently spreadable in response to subsequent axial pulling force between said male and female members thus permitting full disengagement of said detent means and separation said male and female members, and a locking position wherein said web is interposed between and maintains said prong ends in spaced apart relationship to prevent said partial disengagement of said detent means and ensure against separation of said two members.

5. A releasable connector as set forth in claim 4 in which said prong ends have radially enlarged portions defining substantially square detent shoulders.

6. A releasable connector as set forth in claim 4 in which said female member has an inturned lip on said wall adjacent said open end defining a substantially square detent shoulder on each of said legs facing towards said closed end.

7. A releasable connector as set forth in claim 6 in which said prong ends have radially enlarged portions defining substantially square detent shoulders facing said outer end, the prong ends and inturned lips being located and formed to constitute said detent means.

8. A releasable connector comprising:
a male member having an elongated cylindrical body, a longitudinally extending open ended slot diametrically dividing a portion of said body into two substantially semicylindrical prongs connected by an undivided portion of said body and having prong ends normally separated by said slot but resiliently squeezable together in a direction perpendicular to the plane of said slot, said prong ends having radially enlarged portions defining substantially square detent shoulders facing said undivided portion;
a female member including cylindrical tubular wall open at one end for axially receiving said prong ends in said squeezed together condition and being closed at an opposite end, said tubular wall being divided at said open end into four legs by four axially extending slots, an inturned lip on said wall adjacent said open end defining a substantially square detent shoulder on each of said legs facing toward said closed end, said detent shoulders on the prong ends facing said detent shoulders on said legs when the male member is received within the female member for retaining said male member against axial separation from said female member;
a locking ring including including a diametric web extending through said slot, said ring being slideable between a release position away from said prong ends allowing the prong ends to be squeezed together thereby partially disengaging said male and female members, said legs being resiliently spreadable in response to subsequent axial pulling between said male and female members thus permitting full disengagement and separation of said male and female members, and a locking position wherein said web is interposed between and maintains said prong ends in a spaced apart relationship to prevent said partial disengagement of said male and female members;
the male and female members being dimensioned relative to one another to provide a substantial space between the prong ends of the male member and the inner surface of the closed end of the female member, the axially extending slots of the female member being of sufficient length to expose this space; and
the cylindrical body of the male member including at least one relief area on its outer surface to provide a clearance space between the internal surface of the locking member and the outer surface of the male member, this relief area being of sufficient size to permit debris to be dislodged and removed from between the ring and the male member.

9. A releasable connector as set forth in claim 8 in which the male member includes diametrically opposed relief areas which extend to the undivided portion of said body, and in which the sides of the open ended slot in said male member diverge towards said undivided portion to provide internal clearances between the diametric web of the locking ring and the prongs of the male member for removal of debris therefrom, said male member including a bore through its undivided outer end for threading a line through the male member, and said female member including a bore through its closed end for threading a line through said female member.

* * * * *